United States Patent
Chen

(10) Patent No.: US 10,330,856 B2
(45) Date of Patent: Jun. 25, 2019

(54) DISPLAY BACKLIGHT MODULE HAVING LED SOURCE WITH FIBER BUNDLE

(71) Applicants: HKC Corporation Limited, Shenzhen, Guangdong (CN); Chongqing HKC Optoelectronics Technology Corporation Limited, Chongqing (CN)

(72) Inventor: Yu-Jen Chen, Chongqing (CN)

(73) Assignees: HKC CORPORATION LIMITED, Shenzhen, Guangdong (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 85 days.

(21) Appl. No.: 15/537,145

(22) PCT Filed: Feb. 26, 2017

(86) PCT No.: PCT/CN2017/074908
§ 371 (c)(1),
(2) Date: Jun. 16, 2017

(87) PCT Pub. No.: WO2018/120392
PCT Pub. Date: Jul. 5, 2018

(65) Prior Publication Data
US 2019/0025497 A1    Jan. 24, 2019

(30) Foreign Application Priority Data
Dec. 27, 2016    (CN) .......................... 2016 1 1228280

(51) Int. Cl.
G02F 1/13357    (2006.01)
F21V 8/00    (2006.01)
G02F 1/1335    (2006.01)

(52) U.S. Cl.
CPC ......... *G02B 6/0073* (2013.01); *G02B 6/0005* (2013.01); *G02B 6/0008* (2013.01);
(Continued)

(58) Field of Classification Search
CPC ............. F21V 2200/15; F21V 2200/10; F21V 2200/20; G02B 6/0011; G02B 6/001;
(Continued)

(56) References Cited

U.S. PATENT DOCUMENTS 3,718,814 A * 2/1973 Van Slyke ............. G02B 6/001
                                                          362/489
4,824,194 A * 4/1989 Karasawa ................ G02B 6/06
                                                          250/586
(Continued)

FOREIGN PATENT DOCUMENTS

CN    101109869 A    1/2008
CN    101790701 A    7/2010
(Continued)

OTHER PUBLICATIONS

International Search Report for PCT/CN2017/074908, dated May 4, 2017.

*Primary Examiner* — Ismael Negron
(74) *Attorney, Agent, or Firm* — Juan Carlos A. Marquez; Marquez IP Law Office, PLLC

(57) ABSTRACT

The backlight module includes: a light guide plate, having a light incident side; a fiber bundle, disposed on an edge of the light incident side of the light guide plate and having a light guide section and a light emitting section; a light source project light into the fiber bundle; and a light collection reflector, configured to reflect light from the fiber bundle toward the light incident side of the light guide plate. A liquid crystal display panel, configured to display an image, is arranged to receive light from the backlight module.

18 Claims, 12 Drawing Sheets

(52) U.S. Cl.
CPC ......... *G02B 6/0031* (2013.01); *G02B 6/0088* (2013.01); *G02F 1/133615* (2013.01)

(58) Field of Classification Search
CPC .. G02B 6/0033; G02B 6/0073; G02B 6/0076; G02F 1/133615
See application file for complete search history.

(56) References Cited

U.S. PATENT DOCUMENTS

| | | | | |
|---|---|---|---|---|
| 4,845,596 | A * | 7/1989 | Mouissie | G02B 6/001 362/560 |
| 5,799,124 | A * | 8/1998 | Zorn | F21S 8/00 362/559 |
| 6,036,340 | A * | 3/2000 | Fohl | B60Q 1/0011 362/511 |
| 6,104,857 | A * | 8/2000 | Ishiharada | B60Q 1/26 385/123 |
| 6,685,330 | B2 * | 2/2004 | Miyazaki | G01D 11/28 362/23.16 |
| 7,277,618 | B2 * | 10/2007 | Yamazaki | G02B 6/001 385/123 |
| 7,549,783 | B2 * | 6/2009 | Cassarly | G02B 6/001 362/555 |
| 7,618,176 | B2 * | 11/2009 | Ng | A61N 5/0601 362/551 |
| 7,773,849 | B2 * | 8/2010 | Shani | G02B 6/0028 349/144 |
| 8,434,909 | B2 * | 5/2013 | Nichol | G02B 6/0018 362/296.01 |
| 8,582,943 | B2 * | 11/2013 | Alkemper | C03B 37/01211 385/124 |

FOREIGN PATENT DOCUMENTS

| | | |
|---|---|---|
| CN | 101946197 A | 1/2011 |
| CN | 104100924 A | 10/2014 |
| CN | 106019718 A | 10/2016 |
| JP | 2005091494 | 4/2005 |

* cited by examiner

DISPLAY BACKLIGHT MODULE HAVING LED SOURCE WITH FIBER BUNDLE

BACKGROUND

Technical Field

This application relates to a backlight design method, and in particular, to a backlight module and a display device using same.

Related Art

A backlight module (Backlight Module) is a key part that is widely applied to a flat panel display, especially to a liquid crystal display. The backlight module is generally disposed on a back side of a display panel of the liquid crystal display. According to different functional requirements of liquid crystal displays, backlight modules of the liquid crystal displays are mainly classified into a direct backlight module and an edge backlight module.

A thin film transistor liquid crystal display can provide effective display in combination with a backlight module in addition to a glass substrate. For a conventional edge backlight module, a light-emitting diode chip needs to be attached to a side edge of a light guide plate. Because the light-emitting diode chip is large and light-emitting diode light bars need to be integrated on a circuit board, the conventional edge backlight module cannot be used flexibly.

SUMMARY

To resolve the foregoing technical problem, an objective of this application is to provide a backlight design method, and in particular, to provide a backlight module and a display device using same. In addition, a fiber is used to transfer light, a light-emitting diode light bar structure is removed, and characteristics of the fiber such as lightness, thinness, and flexibility are exerted, making a backlight generator system simpler; the fiber emits light by using a side face instead of an end face, thereby implementing use of the fiber flat attached to a light guide plate and making full use of space of the backlight system.

The objective of this application is achieved and the technical problem of the present application is resolved by using the following technical solution. This application provides a backlight module, including: a light guide plate, having a light incident side; a fiber bundle, disposed on an edge of the light incident side of the light guide plate and including a light guide section and a light emitting section; and a light collection reflector, configured to reflect light emitted from the fiber bundle to the light incident side of the light guide plate.

The objective of this application may also be further achieved and the technical problem of the present application may also be further resolved by using the following technical measure.

A display device includes a liquid crystal display panel and a backlight module, and is configured to display an image. The backlight module includes: a light guide plate, a fiber bundle, and a light collection reflector. The fiber bundle is disposed on an edge of a light incident side of the light guide plate and includes a light guide section and a light emitting section. The light collection reflector is configured to reflect, to the light incident side of the light guide plate, light emitted from the fiber bundle. The fiber bundle is segmented and sections are evenly distributed on the edge of the light incident side of the light guide plate. The fiber is used to transfer light. Fiber bundles have a plurality of mixed strands by means of hybrid matching, to increase a size of a light spot on the light incident side and improve light uniformity. The fiber bundle structure includes a light guide section of the fiber bundle and a light emitting section of the fiber bundle. The light guide section of the fiber bundle further includes an inner fiber material and an outer fiber material, and the refractive index of the inner fiber material is greater than the refractive index of the outer fiber material. The light emitting section of the fiber bundle further includes an inner fiber material and an outer fiber material, and the refractive index of the outer fiber material is greater than the refractive index of the inner fiber material. A ratio of the length of the light emitting section to the length of the light guide section is less than 1.

In an embodiment of this application, the light guide section of the fiber bundle includes an inner fiber material and a first outer fiber material, and a refractive index of the inner fiber material is greater than a refractive index of the first outer fiber material.

In an embodiment of this application, the light emitting section of the fiber bundle includes an inner fiber material and a second outer fiber material, and the refractive index of the second outer fiber material is greater than the refractive index of the inner fiber material.

In an embodiment of this application, the light emitting section of the fiber bundle includes a plurality of subsections, and the plurality of subsections are evenly distributed on the edge of the light incident side of the light guide plate.

In an embodiment of this application, the backlight module further includes a plurality of fiber bundles, and the fiber bundles have a plurality of mixed strands by means of hybrid matching, to increase a size of a light spot in the light emitting section of the fiber bundle.

In an embodiment of this application, the backlight module further includes a light source, configured to provide light to the fiber bundle, where the light source is a single-color light-emitting diode or a multi-color light-emitting diode.

In an embodiment of this application, the light guide plate is in a shape of a cuboid or a cube.

In an embodiment of this application, a ratio of the length of the light emitting section to the length of the light guide section is less than 1.

Beneficial effects of this application are: a light-emitting diode light bar is replaced with a fiber, which is capable of implementing a flexible backlight design.

DETAILED DESCRIPTION

Figure 1:
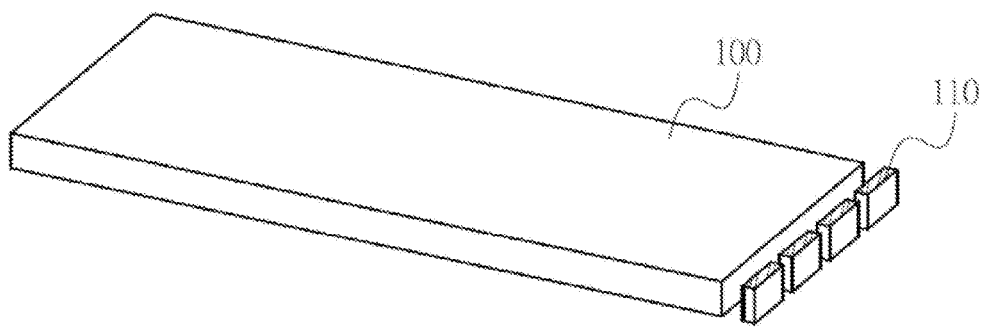
FIG. 1 is a schematic design diagram of an exemplary edge backlight module.

The following embodiments are described with reference to the accompanying drawings, which are used to exemplify specific embodiments for implementation of this application. Terms about directions mentioned in this application, such as "on", "below", "front", "back", "left", "right", "in", "out", and "side surface" merely refer to directions of the accompanying drawings. Therefore, the used terms about directions are used to describe and understand this application, and are not intended to limit this application.

The accompanying drawings and the description are considered to be essentially exemplary, rather than limitative. In figures, units with similar structures are represented by using a same reference number. In addition, for understanding and ease of description, a size and a thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a substrate is described to be "on" "another component", the component may be directly on the another component, or there may be an intermediate component.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of a gravity direction.

To further describe the technical means adopted in this application to achieve the present invention objective and effects thereof, specific implementations, structures, features, and effects of a backlight module and a display device using same provided according to this application are described in detail below with reference to the drawings and preferred embodiments.

A display device of this application includes a liquid crystal display panel and a backlight module, where the liquid crystal display panel and the backlight module are disposed opposite to each other. The liquid crystal display panel includes a multi-color filter substrate, a thin film transistor substrate, and a liquid crystal layer sandwiched between the substrates. The multi-color filter substrate as well as the thin film transistor substrate and the liquid crystal layer can form a plurality of pixel units configured with arrays. The backlight module can emit light passing through the liquid crystal display panel, and each pixel unit of the liquid crystal display panel displays a color to form an image.

In an embodiment, the liquid crystal display panel of this application may be a curved surface display panel, and the display device of this application may be a curved surface display apparatus; the backlight module is disposed in a liquid crystal display device that is in a vertical alignment type mode.

Currently, when developing a wide visual angle technology for a vertical alignment (Vertical Alignment, VA) type of liquid crystal display panel, manufacturers of the liquid crystal display device use a photo-alignment (Photo-alignment) technology to control an alignment direction of a liquid crystal molecule, so as to improve optical performance and yield of liquid crystal display panels. Multi-domain (Multi-domain) alignment is formed within each pixel unit of the panel by using the photo-alignment technology. In this way, liquid crystal molecules within one pixel unit fall towards, for example, four different directions. According to the photo-alignment technology, an ultraviolet light source (for example, polarized light) falls on a polymer thin film (alignment layer) of the multi-color filter substrate or the thin film transistor substrate, and nonuniform photo-polymerization, isomerization, or pyrolytic reaction occurs on a polymer structure on a thin film surface, leading a chemical bonding structure on the thin film surface to generate special directivity, and further leading the liquid crystal molecules to be arranged clockwise, so as to achieve a purpose of photo-alignment.

According to different alignment manners of a liquid crystal, a mainstream liquid crystal display panel on the current market may be classified into the following several types: a vertical alignment (Vertical Alignment, VA) type, a twisted nematic (Twisted Nematic, TN) or super twisted nematic (Super Twisted Nematic, STN) type, an in-plane switching (In-Plane Switching, IPS) type, and a fringe field switching (Fringe Field Switching, FFS) type. A liquid crystal display that is in the vertical alignment (Vertical Alignment, VA) mode is, for example, a patterned vertical alignment (Patterned Vertical Alignment, PVA) liquid crystal display or a multi-domain vertical alignment (Multi-domain Vertical Alignment, MVA) liquid crystal display device. The PVA LCD achieves a wide visual angle effect by using a fringing field effect and a compensating plate. For the MVA LCD, one pixel is divided into a plurality of domains, and a protrusion (Protrusion) or particular pattern is used, to enable liquid crystal molecules in different domains to fall towards different directions, so as to achieve a wide visual angle effect and improve a penetration rate. In the IPS mode or FFS mode, an electric field including a component that is basically parallel to the substrate is applied, so that liquid crystal molecules are corresponding in a direction parallel to a direction of a plane of the substrate, and therefore are driven. Both an IPS liquid crystal display panel and an FFS liquid crystal display panel have an advantage of a wide visual angle.

The backlight module (Backlight Module, BLM) is one of key parts of a thin film transistor liquid crystal display (TFT-LCD). Because the thin film transistor liquid crystal display is not a self-luminous display, light needs to be projected by using a light source and penetrate through related parts such as a light guide structure, a diffuser sheet, a prism sheet, and a liquid crystal panel of the thin film transistor liquid crystal display, finally entering a person's eyes for imaging, to implement a display function.

The backlight module includes two structures according to a location of the light source: an edge type (Edge Type) and a direct type (Direct Type). For the edge type structure, the light source is disposed on a side of the light guide structure. However, light leakage is apt to occur in a light emitting surface, of the light guide structure, near the light source.

FIG. 1 is a schematic design diagram of an exemplary edge backlight module. Referring to FIG. 1, a thin film transistor liquid crystal display can provide effective display in combination with a backlight module in addition to a glass substrate. For a conventional edge backlight module, a light-emitting diode chip 110 needs to be attached to a side edge of a light guide plate 100. Because the light-emitting diode chip 110 is large and light-emitting diode light bars need to be integrated on a circuit board, the conventional edge backlight module cannot be used flexibly.

Figure 2A:
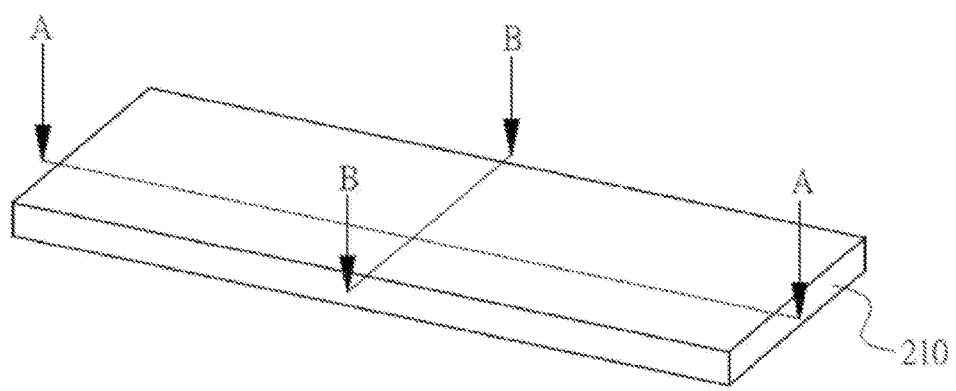
FIG. 2a is a schematic diagram of an exemplary light guide plate.
Figure 2B:
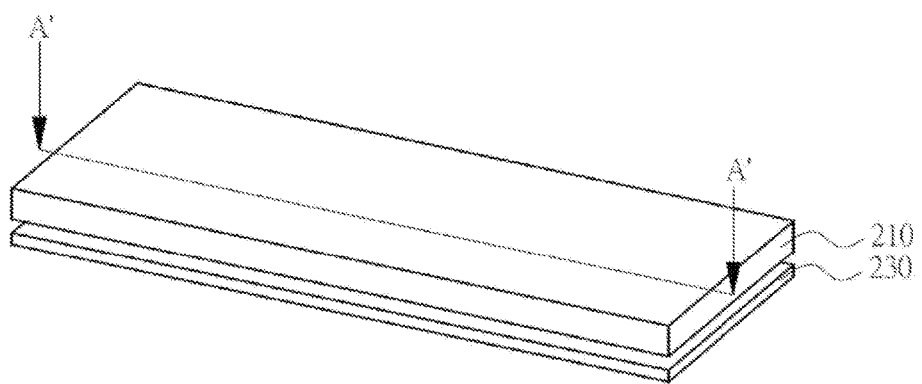
FIG. 2b is a schematic diagram of another exemplary light guide plate.
Figure 2C:
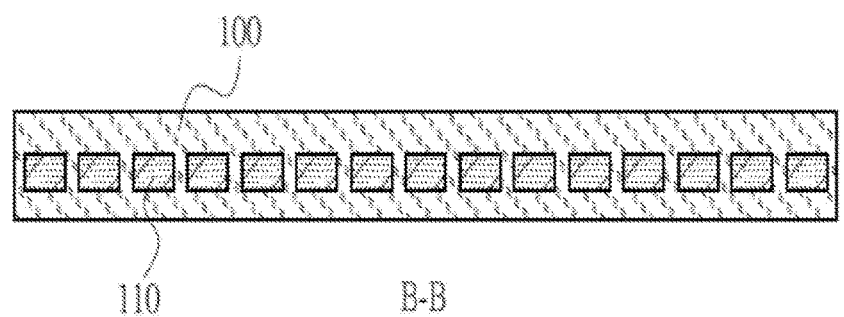
FIG. 2c is a schematic diagram of a cross section along BB of an exemplary light guide plate.
Figure 2D:
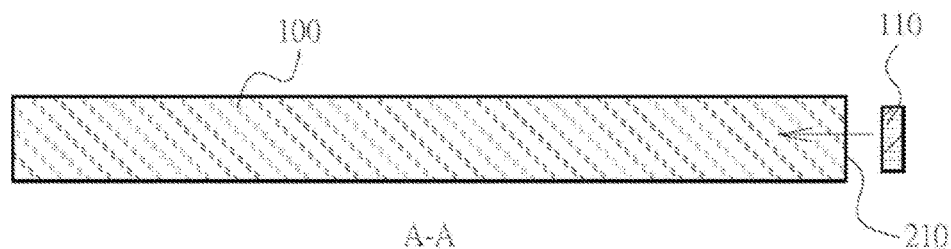
FIG. 2d is a schematic diagram of a cross section along AA of an exemplary light guide plate.
Figure 2E:
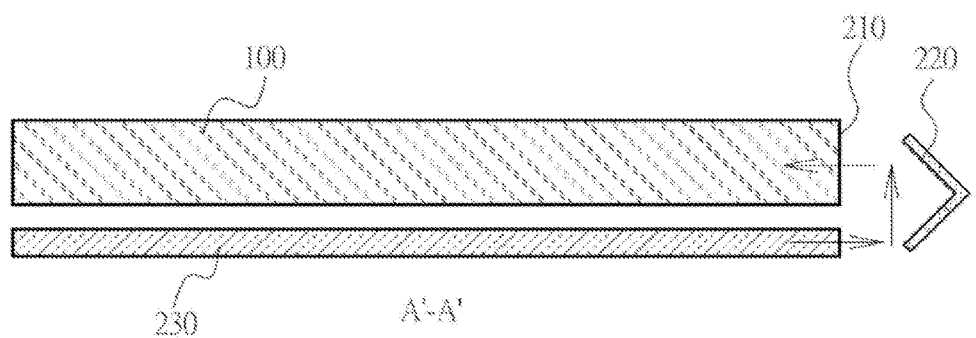
FIG. 2e is a schematic diagram of a cross section along A'A' of another exemplary light guide plate.

FIG. 2a is a schematic diagram of an exemplary light guide plate 100, FIG. 2b is a schematic diagram of another exemplary light guide plate 100, FIG. 2c is a schematic diagram of a cross section along BB of an exemplary light guide plate 100, FIG. 2d is a schematic diagram of a cross section along AA of an exemplary light guide plate 100, and FIG. 2e is a schematic diagram of a cross section along A'A' of another exemplary light guide plate 100. Referring to FIG. 2a, FIG. 2b, FIG. 2c, FIG. 2d, and FIG. 2e, according to an exemplary technology, a fiber bundle 230 is used to replace a light-emitting diode chip 110, and a light collection apparatus 220 is configured to collect light emitted from the fiber bundle 230.

Figure 3A:
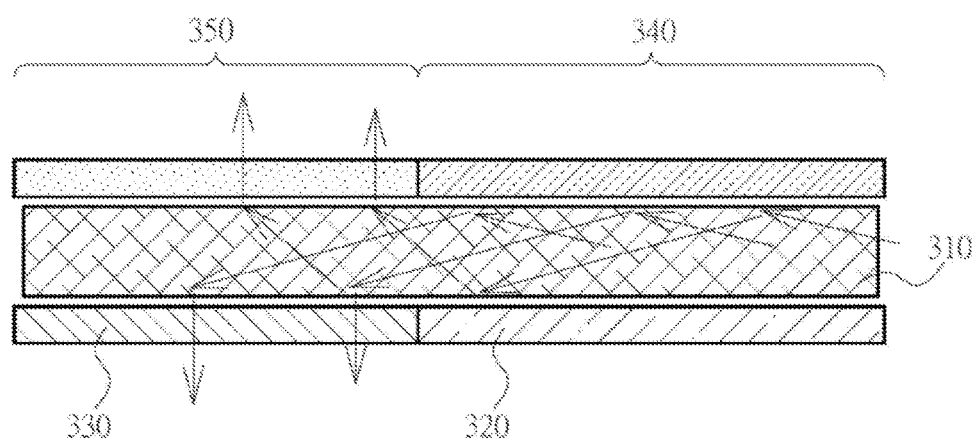
FIG. 3a is a cross-section diagram of a fiber structure according to an embodiment of this application.
Figure 3B:
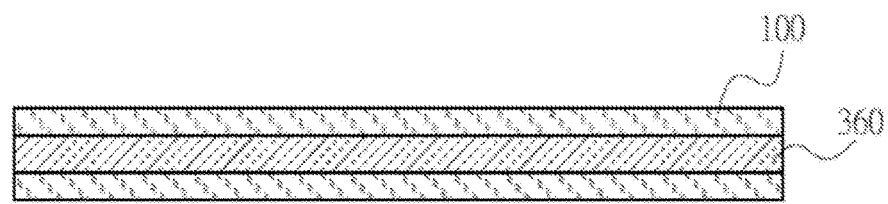
FIG. 3b is a cross-section diagram of a fiber bundle according to an embodiment of this application.
Figure 3C:
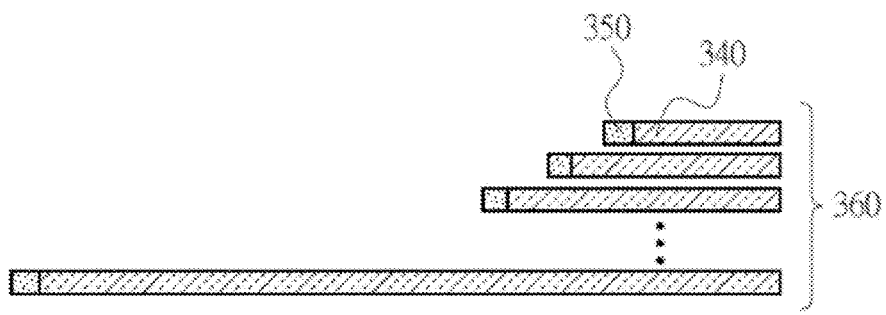
FIG. 3c is an architectural diagram of a fiber bundle group according to an embodiment of this application.

FIG. 3a is a cross-section diagram of a fiber structure according to an embodiment of this application, FIG. 3b is a cross-section diagram of a fiber bundle 360 according to an embodiment of this application, and FIG. 3c is an architectural diagram of a fiber bundle 360 group according to an embodiment of this application. Referring to FIG. 3a, FIG. 3b, and FIG. 3c, in an embodiment of this application, light is guided to a light incident side of a light guide plate 100 by using a fiber. A difference is that in this application, a side face instead of an inherent end face of the fiber is used to emit light. According to a design with different refractive indices of inner and outer layers of the fiber, it is designed that light is fully reflected within a light guide section 340. The refractive indices of the inner and outer materials are different, and the refractive index of the inner material of the fiber is greater than the refractive index of the outer material, which meets a total reflection condition, and the light is transferred with high efficiency. When the light arrives at a light emitting section 350, the refractive index of the outer material of the fiber changes, such that the fiber no longer maintains total reflection, and light reveals and enters the light incident side of the light guide plate 100. According to the refractive index principle $n1 \sin \theta1 = n2 \sin \theta2$, the refractive index of a material 330 is enabled to be greater than the refractive index of a material 310 by changing an outer material of the light emitting section 350 of the fiber.

Referring to FIG. 3a and FIG. 3c, in an embodiment of this application, the structure of the fiber bundle 360 includes the light guide section 340 and the light emitting section 350. The light guide section 340 of the fiber bundle further includes an inner fiber material 310 and an outer fiber material 320, and the refractive index of the inner fiber material 310 is greater than the refractive index of the outer fiber material 320. The light emitting section 350 of the fiber bundle further includes an inner fiber material 310 and an outer fiber material 330, and the refractive index of the outer fiber material 330 is greater than the refractive index of the inner fiber material 310. A ratio of the length of the light emitting section 350 to the length of the light guide section 340 is less than 1.

Still referring to FIG. 3a and FIG. 3c, after entering the structure of the fiber bundle 360, light emitted by a light source is in contact with an interface between layers, generating different results. In an example in which light is in the inner fiber material 310 of the light guide section 340 of the fiber bundle, when the light is in contact with an interface between the outer fiber material 320 and the inner fiber material 310, the light in the inner fiber material 310 can be smoothly reflected to the inner fiber material 310 and is unlikely to be refracted to the outer fiber material 320, because the refractive index of the inner fiber material 310 is greater than the refractive index of the outer fiber material 320. Likewise, in an example in which light is in the inner fiber material 310 of the light emitting section 350 of the fiber bundle, when the light is in contact with an interface between the outer fiber material 330 and the inner fiber material 310, the light in the inner fiber material 310 can be smoothly refracted to the outer fiber material 330 and is unlikely to be reflected back to the inner fiber material 310, because the refractive index of the outer fiber material 330 is greater than the refractive index of the inner fiber material 310.

Figure 4:
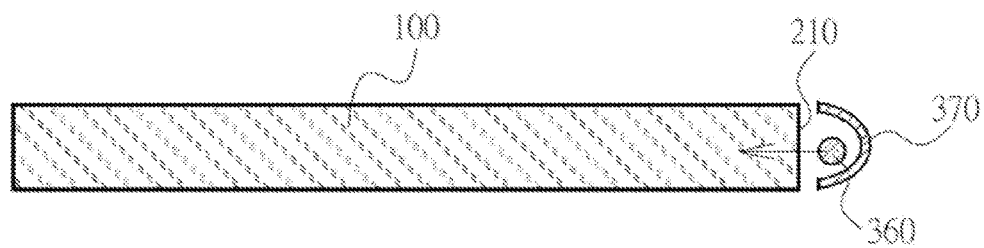
FIG. 4 is a cross-section diagram of a light guide plate having a fiber structure according to an embodiment of this application.

FIG. 4 is a cross-section diagram of a light guide plate 100 having a structure of a fiber bundle 360 according to an embodiment of this application. Referring to FIG. 4, in an embodiment of this application, the light guide plate 100 further includes a fiber bundle 360 and a light collection reflector 370. The fiber bundle 360 is disposed on an edge of a light incident side 210 of the light guide plate 100 and includes a light guide section 340 and a light emitting section 350. The light collection reflector 370 is configured to reflect, to the light incident side 210 of the light guide plate 100, light emitted from the fiber bundle 360.

Figure 5A:
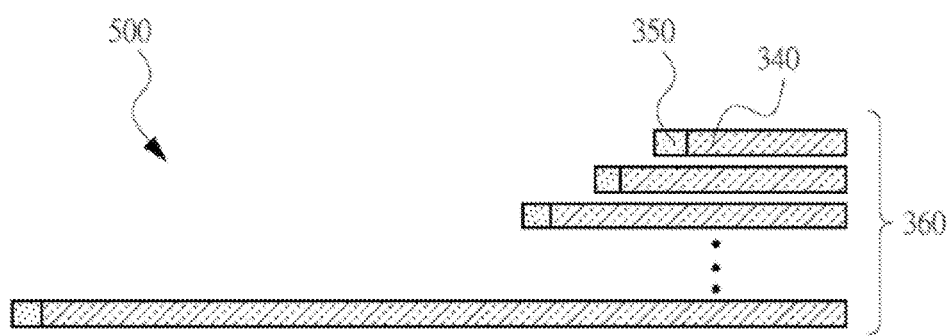
FIG. 5a is an architectural diagram of another fiber bundle group according to an embodiment of this application.
Figure 5B:
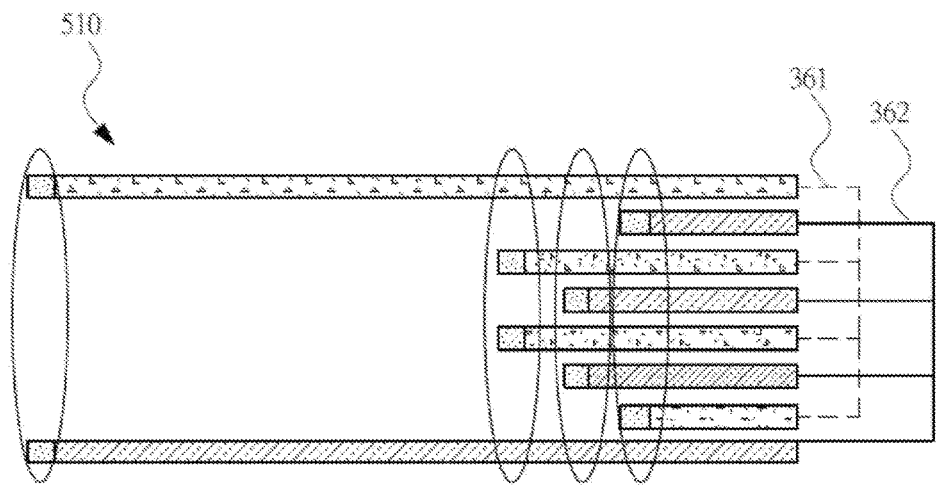
FIG. 5b is an architectural diagram of mixing arrangement of a light emitting section of a fiber according to an embodiment of this application.

FIG. 5a is an architectural diagram of another fiber bundle group 500 according to an embodiment of this application, and FIG. 5b is an architectural diagram of mixing arrangement 510 of a light emitting section of a fiber according to an embodiment of this application. Referring to FIG. 5a and FIG. 5b, the fiber bundle 360 are segmented and sections are evenly distributed on an edge of a light incident side 210 of the light guide plate 100. The fiber is used to transfer light. The fiber bundles 361 and 362 have a plurality of mixed strands by means of hybrid matching, so as to increase a size of a light spot on the light incident side 210 and improve light uniformity.

In an embodiment of this application, the light source is configured to provide light to the fiber bundle, and the light source may be a single-color light-emitting diode or a multi-color light-emitting diode, a cold cathode fluorescent lamp (Cold Cathode Fluorescent Lamp, CCFL), an organic light-emitting diode (Organic Light Emitting Diode, OLED), an electro-luminescence part (Electro-Luminescence, EL), a light bar (Light Bar), or any combination thereof.

Referring to FIG. 4, in an embodiment of this application, the light guide plate 100 is in a shape of a cuboid or a cube.

Referring to FIG. 3a, FIG. 3c, FIG. 4, FIG. 5a, and FIG. 5b, in an embodiment of this application, a display device includes a liquid crystal display panel and a backlight module, and is configured to display an image. The backlight module includes a light guide plate 100, a fiber bundle 360, and a light collection reflector 370. The fiber bundle 360 is disposed on an edge of a light incident side 210 of the light guide plate 100 and includes a light guide section 340 and a light emitting section 350. The light collection reflector 370 is configured to reflect, to the light incident side 210 of the light guide plate 100, light emitted from the fiber bundle 360. The fiber bundle 360 is segmented and sections are evenly distributed on the edge of the light incident side 210 of the light guide plate 100. The fiber is used to transfer light. The fiber bundles 361 and 362 have a plurality of mixed strands by means of hybrid matching, so as to increase a size of a light spot on the light incident side 210 and improve light uniformity. The structure of the fiber bundle 360 includes the light guide section 340 and the light emitting section 350. The light guide section 340 of the fiber bundle further includes an inner fiber material 310 and an outer fiber material 320, and the refractive index of the inner fiber material 310 is greater than the refractive index of the outer fiber material 320. The light emitting section 350 of the fiber bundle further includes an inner fiber material 310 and an outer fiber material 330, and the refractive index of the outer fiber material 330 is greater than the refractive index of the inner fiber material 310. After entering the structure of the fiber bundle 360, light emitted by a light source is in contact with an interface between layers, generating different results. In an example in which light is in the inner fiber material 310 of the light guide section 340 of the fiber bundle, when the light is in contact with an interface between the outer fiber material 320 and the inner fiber material 310, the light in the inner fiber material 310 can be smoothly reflected to the inner fiber material 310 and is unlikely to be refracted to the outer fiber material 320, because the refractive index of the inner fiber material 310 is greater than the refractive index of the outer fiber material 320. Likewise, in an example in which light is in the inner fiber material 310 of the light emitting section 350 of the fiber bundle, when the light is in contact with an interface between the outer fiber material 330 and the inner fiber material 310, the light in the inner fiber material 310 can be smoothly refracted to the outer fiber material 330 and is unlikely to be reflected back to the inner fiber material 310, because the refractive index of the outer fiber material 330 is greater than the refractive index of the inner fiber material 310. A ratio of the length of the light emitting section 350 to the length of the light guide section 340 is less than 1.

Beneficial effects of this application are: a light-emitting diode light bar is replaced with a fiber, which is capable of implementing a flexible backlight design; a fiber is used to transfer light, a light-emitting diode light bar structure is removed, and characteristics of the fiber such as lightness, thinness, and flexibility are exerted, making a backlight generator system simpler; and the fiber emits light by using a side face instead of an end face, thereby implementing use of the fiber flat attached to a light guide plate and making full use of space of the backlight system.

Terms such as "in some embodiments" and "in various embodiments" are repeatedly used. Usually, the terms do not refer to a same embodiment; but they may also refer to a same embodiment. Words such as "comprise", "have", "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some equivalent variations or modifications according to the foregoing disclosed technical content without departing from the scope of the technical solutions of this application to obtain equivalent embodiments. Any simple amendment, equivalent change or modification made to the foregoing embodiments according to the technical essence of this application without departing from the content of the technical solutions of this application shall fall within the scope of the technical solutions of this application.

What is claimed is:

1. A backlight module, comprising:
   a light guide plate, having a light incident side;
   a fiber bundle, disposed on an edge of the light incident side of the light guide plate and including a light guide section and a light emitting section; and
   a light collection reflector, configured to reflect light emitted from the fiber bundle to the light incident side of the light guide plate,
   wherein the light emitting section of the fiber bundle comprises an inner fiber material and a second outer fiber material, and the refractive index of the second outer fiber material is greater than the refractive index of the inner fiber material.

2. The backlight module according to claim 1, wherein the light guide section of the fiber bundle comprises an inner fiber material and a first outer fiber material, and a refractive index of the inner fiber material is greater than a refractive index of the first outer fiber material.

3. The backlight module according to claim 1, wherein the light emitting section of the fiber bundle comprises a plurality of subsections, and the plurality of subsections are evenly distributed on the edge of the light incident side of the light guide plate.

4. The backlight module according to claim 1, further comprising: a plurality of fiber bundles, wherein each fiber bundle has a plurality of strands configured to increase a size of a light spot in the light emitting section of the fiber bundle.

5. The backlight module according to claim 1, further comprising a light source, configured to provide light to the fiber bundle, wherein the light source is a single-color light-emitting diode or a multi-color light-emitting diode.

6. The backlight module according to claim 1, wherein the light guide plate is in a shape of a cuboid.

7. The backlight module according to claim 1, wherein the light guide plate is in a shape of a cube.

8. The backlight module according to claim 1, wherein a ratio of the length of the light emitting section to the length of the light guide section is less than 1.

9. A display device, comprising a liquid crystal display panel and a backlight module, and configured to display an image, wherein the backlight module comprises:
   a light guide plate, having a light incident side;
   a fiber bundle, disposed on an edge of the light incident side of the light guide plate and divided into a light guide section and a light emitting section; and
   a light collection reflector, configured to reflect light emitted from the fiber bundle to the light incident side of the light guide plate,
   wherein the light emitting section of the fiber bundle comprises an inner fiber material and a second outer fiber material, and the refractive index of the second outer fiber material is greater than the refractive index of the inner fiber material.

10. The display device according to claim 9, wherein the light guide section of the fiber bundle comprises an inner fiber material and a first outer fiber material, and a refractive index of the inner fiber material is greater than a refractive index of the first outer fiber material.

11. The display device according to claim 9, wherein the light emitting section of the fiber bundle comprises a plurality of subsections, and the plurality of subsections are evenly distributed on the edge of the light incident side of the light guide plate.

12. The display device according to claim 9, further comprising a plurality of fiber bundles, wherein each fiber bundle has a plurality of strands configured to increase a size of a light spot in the light emitting section of the fiber bundle.

13. The display device according to claim 9, wherein the light guide plate is in a shape of a cuboid.

14. The display device according to claim 9, wherein the light guide plate is in a shape of a cube.

15. The display device according to claim 9, wherein a ratio of the length of the light emitting section to the length of the light guide section is less than 1.

16. The display device according to claim 9, further comprising a light source, configured to provide light to the fiber bundle.

17. The display device according to claim 16, wherein the light source is a single-color light-emitting diode or a multi-color light-emitting diode.

18. A backlight module, comprising:
a light guide plate, having a light incident side;
a fiber bundle, disposed on an edge of the light incident side of the light guide plate and divided into a light guide section and a light emitting section; and
a light collection reflector, configured to reflect light emitted from the fiber bundle to the light incident side of the light guide plate, wherein
the light guide section of the fiber bundle comprises an inner fiber material and a first outer fiber material, and a refractive index of the inner fiber material is greater than a refractive index of the first outer fiber material;
the light emitting section of the fiber bundle comprises an inner fiber material and a second outer fiber material, and the refractive index of the second outer fiber material is greater than the refractive index of the inner fiber material;
the light emitting section of the fiber bundle comprises a plurality of subsections, and the plurality of subsections are evenly distributed on the edge of the light incident side of the light guide plate;
fiber bundles have a plurality of mixed strands by means of hybrid matching, to increase a size of a light spot in the light emitting section of the fiber bundle;
the light guide plate is in a shape of a cuboid; and
a ratio of the length of the light emitting section to the length of the light guide section is less than 1.

* * * * *